Dec. 6, 1960   C. S. PELLOW ET AL   2,963,141
CONVEYOR UNLOADING MEANS
Filed June 14, 1956   3 Sheets-Sheet 1

INVENTORS
CHARLES S. PELLOW
RICHARD A. PELLOW
BY Hawley & Hardesty
ATTORNEYS

Dec. 6, 1960  C. S. PELLOW ET AL  2,963,141
CONVEYOR UNLOADING MEANS
Filed June 14, 1956
FIG.3.
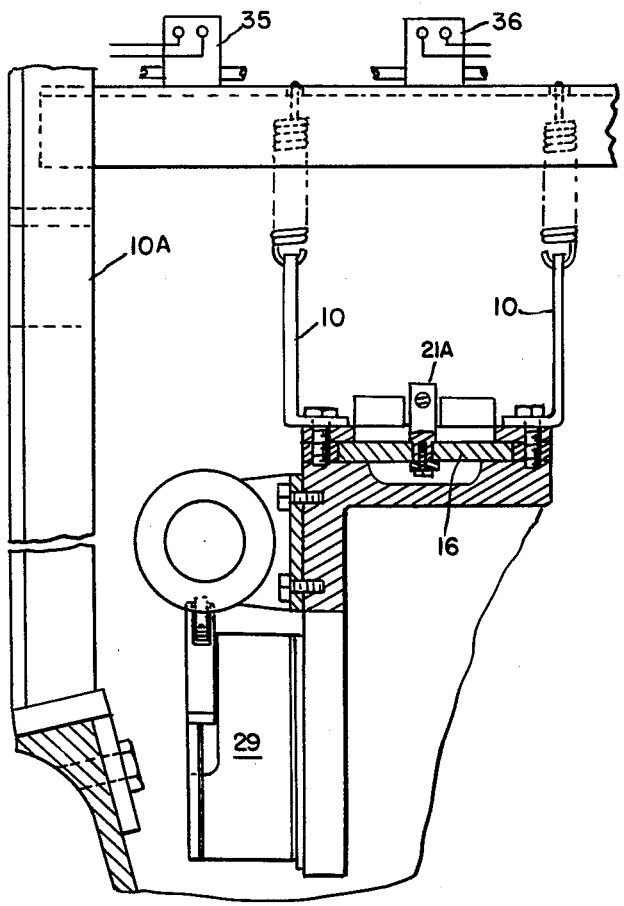
FIG.5.
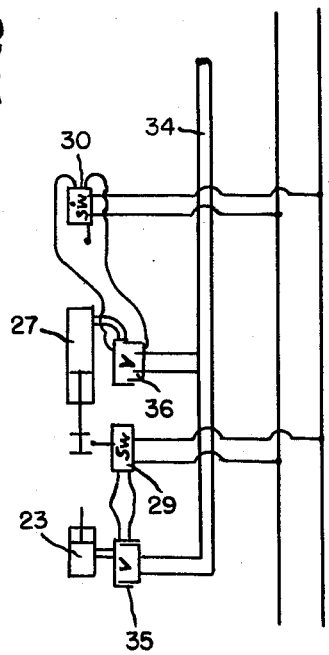
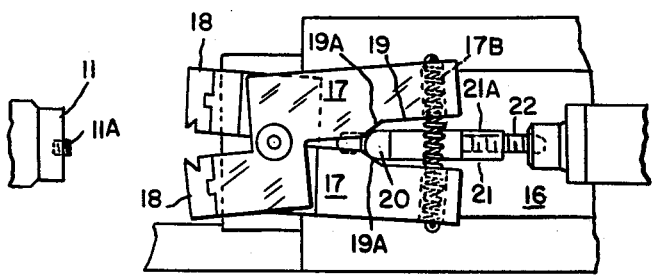
FIG.4.
INVENTOR.
CHARLES S. PELLOW
RICHARD A. PELLOW
BY
ATTORNEYS

2,963,141
CONVEYOR UNLOADING MEANS

Charles S. Pellow, 17311 Prairie Ave., Detroit 21, Mich., and Richard A. Pellow, 24709 Winona, Dearborn, Mich.

Filed June 14, 1956, Ser. No. 591,423

3 Claims. (Cl. 198—20)

The present invention relates to unloading means for removing work pieces from the conveyor fixtures of machines in which the pieces such as machine parts, have been subjected to some sort of processing and in which the articles are more or less firmly held by the fixtures in the conveyor.

The present unloading means has been designed specifically to unload the conveyor of machines such as are used in milling kerfs in screw parts, nuts, etc., but is not limited to such machines, as with minor modifications, it may be adapted to any other similar machine.

Among the objects of the invention is to provide unloading means which may be accurately timed and actuated to remove the individual articles or pieces as the conveyor elements arrive at or pass a given location.

Another object is to provide unloading means which may be accurately timed by the conveyor itself or asso-ciated means.

Still other objects and advantages will readily occur to those skilled in the art upon reference to the following description and the accompanying drawings in which Fig. 1 is a side elevation of the unloading means.

Fig. 3 is a sectional view on line 3—3 of Fig. 2.

Fig. 4 is a view of a part of Fig. 2 with the parts in a different position.

Fig. 5 is a schematic drawing showing the air pressure and electric connections.

Figure 1:
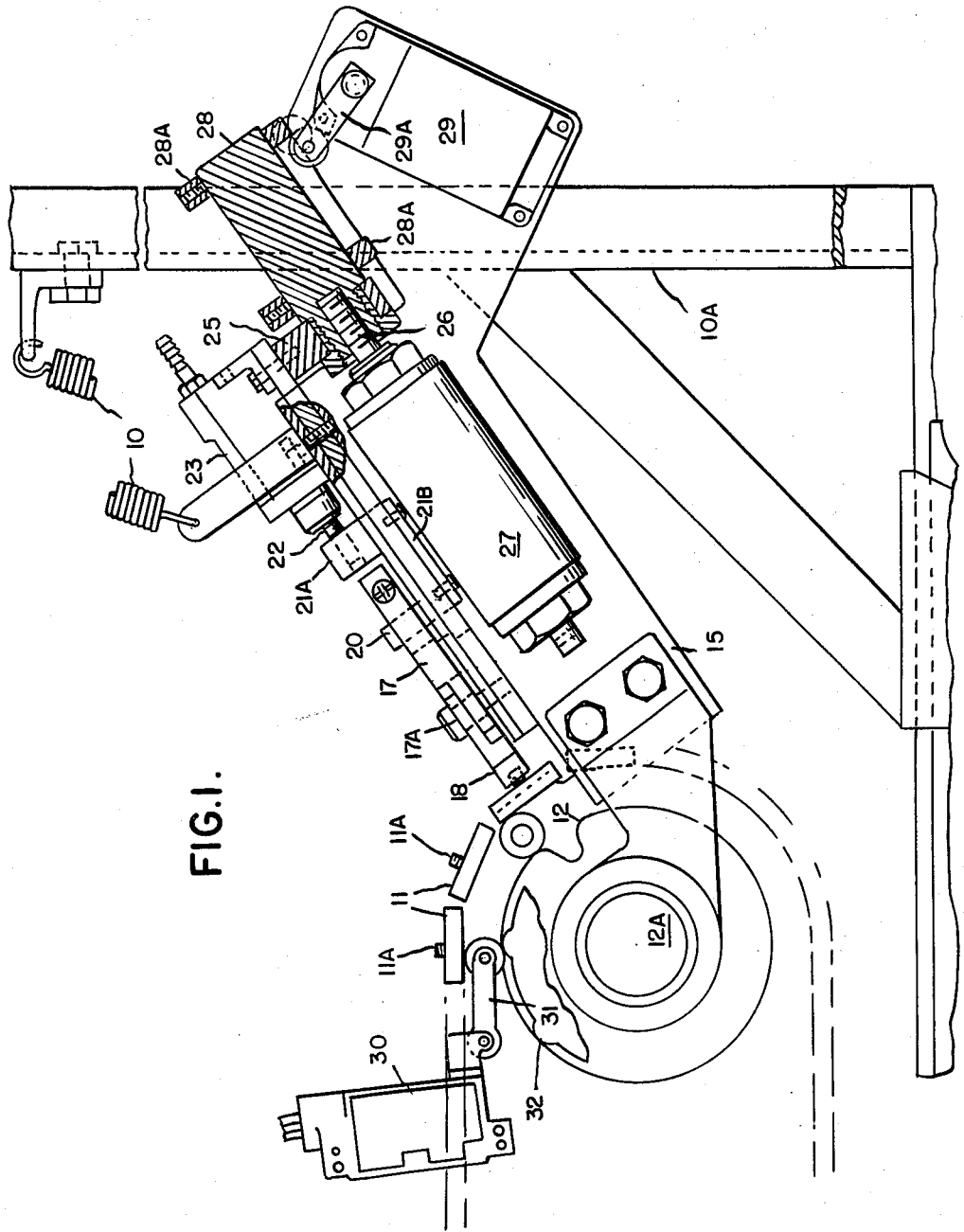
Figure 2:
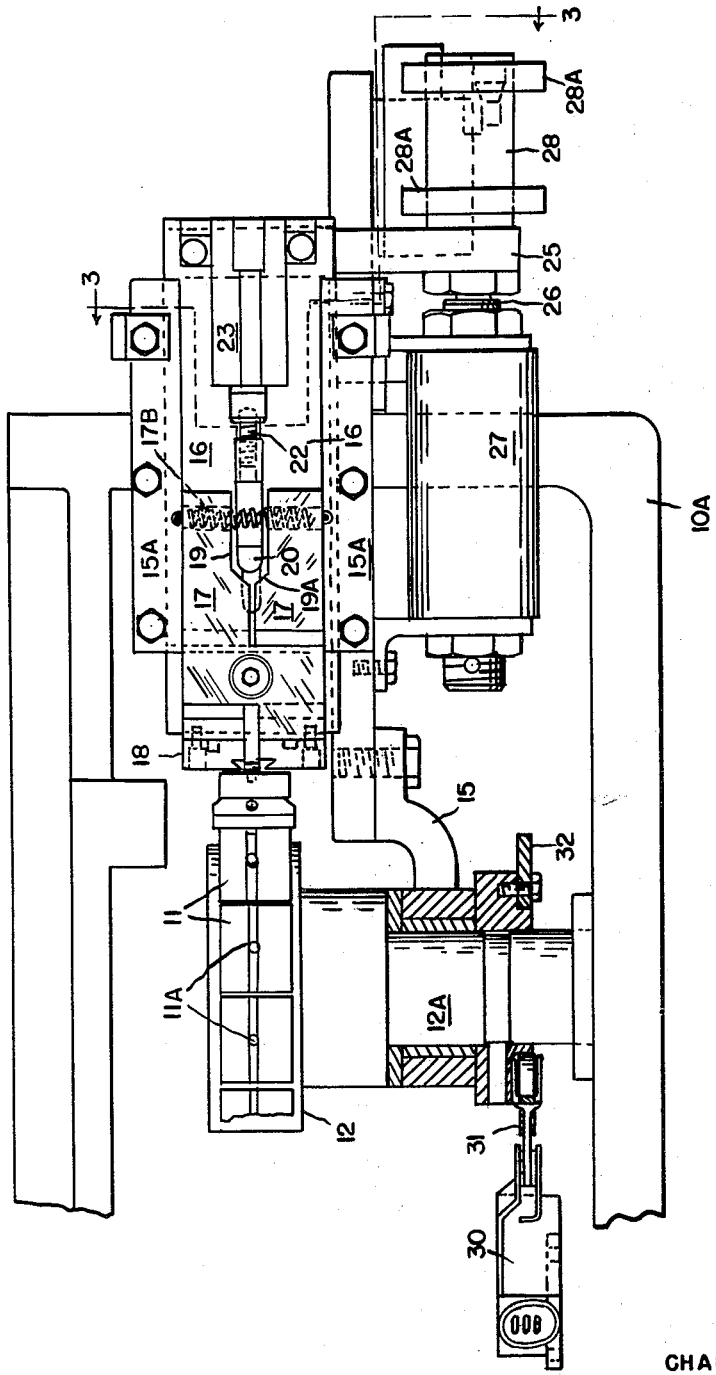
Fig. 2 is a plan view of the same.

In the drawings, the unloading mechanism is shown as supported by suitable springs 10 from a frame 10A which is mounted on or is a part of the frame of the processing machine (not shown in its entirety). However, as indicated above, the processing machine includes a conveyor comprising small carriages or fixtures 11, each arranged to hold one or more of the workpieces, as indicated at 11A. This conveyor is supported upon and may be actuated by a gear or sprocket 12 carried on shaft 12A.

The unloading mechanism is shown in side elevation in Fig. 1, comprises a small frame 15 rotatably supported at its lower end upon the horizontally arranged shaft 12A and at its upper end by the springs 10. Mounted on frame 15 in suitable slides 15A is a carriage plate 16 arranged to reciprocate toward and from the conveyor 11. The carriage plate 16 has mounted upon it a pair of members 17 crossing each other and pivoted upon a pin 17A fixed in the plate 16. These members 17 extend beyond the lower end of the plate and are provided with detachable jaw pieces 18. The form of jaw piece 18 will depend upon the shape and size of the workpiece 11A. The members 17 are normally held in jaw-closed position by means of a suitable spring 17B. As seen best in Fig. 4, the rear portions of members 17 are cut away to provide a slot 19 whose sides are parallel when the jaws are closed, but in which, at the bottom, the side walls incline inwardly to provide cam surfaces at 19A, adapted to cooperate with the nose 20 of a member 21A fixed to the piston rod or plunger 22 of a small single acting air cylinder 23 also mounted on plate 16. The member 21 is conveniently U-shaped and carried in a suitable longitudinal slot in plate 16 with the nosepiece 20 and the other arm 21A extending above the plate as shown and held against displacement by a plate 21B. One of the arms is the nose 20 and the other 21A is fixed to the piston rod 22. The upper end of plate 16 is provided with a laterally extending arm 25 which is fixed to the piston rod or plunger 26 of a second single acting air cylinder 27 mounted on the frame 15 and arranged to reciprocate the plate 16 in its slides. Carried on the outer end of plunger 26 is an extension member 28 provided with a pair of adjustably located switch actuators 28A adapted to contact and operate the actuating arm 29A of a suitable electric switch 29 fixed upon the frame 15, and one actuator 28A closing the switch circuit and the other opening the circuit.

Mounted upon the frame (not shown) of the conveyor carrying processing machine, is another switch, preferably a microswitch 30, the actuating arm 31 of which is moved to closed circuit position by means of a multiple cam member 32 fixed to the shaft 12A and provided with the same number of cams as the number of conveyor carriages passing with the revolution of conveyor gear 12, and correspondingly spaced.

The two cylinders 23 and 27 are connected to a course of supply of compressed air 34 through solenoid controlled three-way valves 35 and 36, the one 35 being controlled by the switch 29 and the other 36 by the switch 30.

In the operation of the unloader, as the moving conveyor carriage approaches a position in which it is normal to and adjacent the plane of plate 16, one of the cams on the cam plate 32 actuates the switch 30 to close the circuit through valve 36 to open the latter and allow the compressed air which has been confined in the lower end (Fig. 1) of cylinder 27 to escape from the cylinder and thereby allow the piston's return spring to move the plate 16 toward the conveyor.

As the plate 16 moves toward the conveyor, the jaws 18 are maintained in open position by the nose piece 20 which is in the position of Fig. 4. Near the end of the downward movement of the plate 16, the outermost actuator 28A, carried by the extension 28 of the piston rod in cylinder 27, actuates the switch 29 to close the circuit through solenoid valve 35 and allow the escape of air pressure from the upper end (Fig. 1) of cylinder 23 so as to allow the spring return to withdraw the nose piece 20 and allow the jaws 18 to close on the workpiece 11A.

As the plate 16 reaches the lower end of its movement, the circuit through switch 30 and valve 36 is opened to direct air pressure to the lower end (Fig. 1) of cylinder 27 moving the plate 16 to its upper position.

During the return of the plate 16, the nosepiece 20 is maintained withdrawn from its lower position and the jaws 18 grip the workpiece through the action of spring 17B. However, as the plate approaches the upper end of its travel, the innermost actuator 28A actuates the switch 29 to open its circuit through valve 35 directing the air pressure into cylinder 23 to move the nose piece 20 downwardly, to open the jaws 18 and release the piece 11A, the jaws remaining open until the next cycle.

As indicated above, in order to adapt the unloader for workpieces of different sizes and shapes, the conformation and size of the removable jaws 18 may be changed and variations in the conveyor may require a corresponding change in the cam plate 32.

While the above description specifies the use of fluid pressure motivation of the pistons in cylinders 23 and 27 with spring return, it is obvious that two-way pressure cylinders may be used if desired, providing positive movement in both directions.

We claim:

1. In combination with a machine for processing parts and involving a conveyor having fixtures for holding said parts while being processed, an unloading means for removing the parts from said fixtures, said unloading means comprising a reciprocable carriage movable in a plane normal to the plane of a fixture, fluid pressure means for moving said carriage away from said fixture, a solenoid valve for controlling said pressure means, a cam-operated electric switch for establishing an electric circuit through said solenoid valve, said cam being carried by the conveyor, a gripper mounted on said carriage, fluid pressure means on said carriage for operating said gripper, a solenoid valve for controlling the gripper operating means, an electric switch for establishing a circuit through the second mentioned valve and means carried by the fluid pressure carriage moving means for actuating the last mentioned switch.

2. In combination with a machine for processing machine parts and involving a conveyor having fixtures for holding the parts being processed, said conveyor passing over a sprocket wheel at its delivery end, an unloader mounted at the delivery end of the conveyor upon a frame, one end of which is rotatively supported upon the sprocket axle, and the other end of which is resiliently suspended from a suitable fixed support, a reciprocable carriage carried by said frame and movable toward and away from the conveyor, said carriage having mounted thereon a gripper having jaws conforming in size and shape to the part to be unloaded, and fluid pressure means for actuating said gripper, fluid pressure means on said frame for reciprocating said carriage, a first valve for controlling the supply of fluid pressure to said gripper actuating means, a second valve for controlling the supply of fluid pressure to said carriage reciprocating means, means for actuating the first valve and valve actuating means operatively connected to said conveyor for actuating the second valve.

3. In combination with a machine for processing machine parts and comprising a continuously moving traveling conveyor provided with fixtures for holding said machine parts being processed, a sprocket wheel supporting said conveyor at the delivery end, a shaft for said wheel, an unloader frame structure rotatively supported at one end upon said shaft, a support, the frame structure yieldingly supported at the other end from said support and thereby disposed generally radially of said sprocket wheel, a reciprocable carriage carried by said frame structure and movable toward and away from the conveyor in a plane substantially normal to travel of the fixture at the point of delivery, said reciprocable carriage having mounted thereon a gripper device having jaws conforming in size and shape to the machined part to be unloaded, means for actuating said carriage and said gripper device and comprising means timed with operation of said conveyor to advance and retract said carriage and means timed to the movement of said carriage to actuate the gripper device whereby to close the gripper device on said machined part when said carriage is advanced toward the conveyor and has reached the end of its advancing stroke and operable to thereby remove the part from said conveyor on the retracting stroke and to release the gripper device when said carriage reaches the fully retracted positions.

References Cited in the file of this patent

UNITED STATES PATENTS

| | | |
|---|---|---|
| 1,136,275 | Roehrich | Apr. 20, 1915 |
| 1,971,110 | Lhoest | Aug. 21, 1934 |
| 2,541,574 | Crooks | Feb. 13, 1951 |
| 2,584,466 | Kaserman | Feb. 5, 1952 |
| 2,661,101 | Mullan et al. | Dec. 1, 1953 |
| 2,677,342 | Miller | May 4, 1954 |
| 2,713,426 | Drew | July 19, 1955 |
| 2,763,229 | Sahlin | Sept. 18, 1956 |
| 2,811,266 | Udahl | Oct. 29, 1957 |